US012151591B2

(12) United States Patent
Maeda (10) Patent No.: US 12,151,591 B2
(45) Date of Patent: Nov. 26, 2024

(54) ELECTRIFIED VEHICLE

(71) Applicants:TOYOTA JIDOSHA KABUSHIKI KAISHA, Toyota (JP); SUBARU CORPORATION, Tokyo (JP)

(72) Inventor: Hiroki Maeda, Susono (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 245 days.

(21) Appl. No.: 17/828,610

(22) Filed: May 31, 2022

(65) Prior Publication Data
US 2023/0012058 A1    Jan. 12, 2023

(30) Foreign Application Priority Data

Jul. 7, 2021    (JP) .................................. 2021-113099

(51) Int. Cl.
    *B60L 7/18*      (2006.01)
(52) U.S. Cl.
    CPC ........... *B60L 7/18* (2013.01); *B60L 2240/545* (2013.01)
(58) Field of Classification Search
    CPC ................. B60L 7/18; B60L 2240/545; B60L 2240/423; B60L 2240/463; B60L 2240/54; B60L 7/14; B60L 7/16; B60L 7/10; Y02T 10/70
See application file for complete search history.

(56) References Cited

U.S. PATENT DOCUMENTS

| | | | | |
|---|---|---|---|---|
| 5,923,093 | A | * | 7/1999 | Tabata .................. B60L 3/0061 903/910 |
| 2004/0235613 | A1 | | 11/2004 | Aoki et al. |
| 2013/0015791 | A1 | | 1/2013 | Hatsumi et al. |
| 2017/0282898 | A1 | | 10/2017 | Shimizu et al. |
| 2020/0180432 | A1 | * | 6/2020 | Gauthier ......... B60W 30/18127 |
| 2021/0245720 | A1 | * | 8/2021 | Kava ..................... B62D 37/02 |
| 2023/0211762 | A1 | * | 7/2023 | Kang .................... B60W 50/10 303/114.1 |

FOREIGN PATENT DOCUMENTS

| | | |
|---|---|---|
| JP | 2003-254110 A | 9/2003 |
| JP | 2007-290614 A | 11/2007 |
| JP | 2013-027063 A | 2/2013 |
| JP | 2013-027065 A | 2/2013 |
| JP | 2017-184459 A | 10/2017 |
| JP | 2020-118057 A | 8/2020 |

* cited by examiner

*Primary Examiner* — James M McPherson
*Assistant Examiner* — Kyle J Kingsland
(74) *Attorney, Agent, or Firm* — Dinsmore & Shohl LLP (57) ABSTRACT

An electrified vehicle includes a motor connected to wheels and configured to perform regenerative braking at the wheels, a battery configured to store regenerative electric power output by the motor through the regenerative braking, and a controller configured to control the regenerative braking such that a braking torque applied to the wheels is less than or equal to a maximum braking torque and the regenerative electric power output by the motor is lower than or equal to a maximum regenerative electric power. The controller is configured to be able to change the maximum regenerative electric power and, when the controller has changed the maximum regenerative electric power, change the maximum braking torque.

5 Claims, 6 Drawing Sheets

ELECTRIFIED VEHICLE

CROSS-REFERENCE TO RELATED APPLICATION

This application claims priority to Japanese Patent Application No. 2021-113099 filed on Jul. 7, 2021, incorporated herein by reference in its entirety.

BACKGROUND

1. Technical Field

A technology disclosed in the specification relates to an electrified vehicle.

2. Description of Related Art

Japanese Unexamined Patent Application Publication No. 2017-184459 describes an electrified vehicle. The electrified vehicle includes a motor that is connected to wheels and that performs regenerative braking at the wheels, a battery that stores regenerative electric power output by the motor through the regenerative braking, and a controller that controls regenerative braking of the motor.

SUMMARY

Generally, in regenerative braking of a motor, a limiting value (hereinafter, referred to as maximum braking torque) is set on a braking torque such that the braking torque applied to the wheels is not excessive. A limiting value (hereinafter, referred to as maximum regenerative electric power) is also set on a regenerative electric power supplied to the battery such that the regenerative electric power is not excessive. In this case, when the speed of the electrified vehicle is in a medium and high speed range, the regenerative electric power reaches the maximum regenerative electric power before the braking torque reaches the maximum braking torque. Thus, the regenerative braking of the motor is limited. On the other hand, when the speed of the electrified vehicle decreases and falls in a low speed range, the braking torque reaches the maximum braking torque before the regenerative electric power reaches the maximum regenerative electric power. Thus, the regenerative braking of the motor is limited. As a result, there can be a difference in actually generated braking torque between the medium and high speed range and the low speed range, and the difference is comparatively small.

However, a set value of the maximum regenerative electric power can be changed in accordance with, for example, the charging rate or temperature of the battery. When, for example, the charging rate of the battery is high, regenerative electric power supplied to the battery is able to be limited by decreasing the maximum regenerative electric power as compared to normal times. On the other hand, when the maximum regenerative electric power is decreased, regenerative braking is further limited in the medium and high speed range. Thus, actually generated braking torque further decreases. As a result, this leads to further large variations in actually generated braking torque between the medium and high speed range and the low speed range. Such a behavior of the electrified vehicle, different from normal times, may make a user in the electrified vehicle feel uncomfortable.

The specification provides a technology capable of appropriately limiting regenerative braking of an electrified vehicle while reducing an uncomfortable feeling of a user.

An aspect of the technology described in the specification is implemented in an electrified vehicle. The electrified vehicle includes a motor connected to wheels and configured to perform regenerative braking at the wheels, a battery configured to store regenerative electric power output by the motor through the regenerative braking, and a controller configured to control the regenerative braking such that a braking torque applied to the wheels is less than or equal to a maximum braking torque and the regenerative electric power output by the motor is lower than or equal to a maximum regenerative electric power. The controller is configured to be able to change the maximum regenerative electric power and, when the controller has changed the maximum regenerative electric power, change the maximum braking torque.

In the above-described electrified vehicle, the maximum braking torque that is a limiting value is set on the braking torque generated through regenerative braking such that the braking torque applied to the wheels is not excessive. The maximum regenerative electric power that is a limiting value is set on the regenerative electric power generated through regenerative braking such that the regenerative electric power applied to the battery is not excessive. In addition, the controller may be configured to be able to change the maximum regenerative electric power in accordance with, for example, a charging rate or temperature of the battery and, when the controller has changed the maximum regenerative electric power, change the maximum braking torque. Thus, when the maximum regenerative electric power has been changed, a braking torque actually generated in a low speed range is also able to be varied in synchronization with a variation in braking torque actually generated in a medium and high speed range. It is possible to match or approximate variations in braking torque actually generated from the medium and high speed range to the low speed range before and after the maximum regenerative electric power is changed. Therefore, it is possible to reduce an uncomfortable feeling of a user and appropriately limit regenerative braking of the electrified vehicle.

In the above aspect, the controller may be configured to determine a change width by which the maximum braking torque is changed, in accordance with a change width by which the maximum regenerative electric power has been changed.

In the above aspect, the controller may be configured to, when the controller has changed the maximum regenerative electric power, identify a variation width of a stimulus received by a user before and after the change and determine the change width by which the maximum braking torque is changed, in accordance with the identified variation width of the stimulus.

In the above aspect, a variation width of a stimulus received by the user in accordance with the change width of the maximum regenerative electric power may be equal to a variation width of a stimulus received by the user in accordance with the change width of the maximum braking torque.

In the above aspect, the controller may be configured to be able to change the maximum braking torque regardless of whether the maximum regenerative electric power has been changed.

In the above aspect, the controller may be configured to, when the controller has changed the maximum braking torque, identify a variation width of a stimulus received by the user before and after the change and set a limit on a braking torque in each vehicle speed range in accordance with the identified variation width of the stimulus.

In the above aspect, the controller may be configured to change the maximum braking torque in accordance with a property of a road surface on which the electrified vehicle runs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an embodiment of the technology, a controller may change a maximum regenerative electric power in accordance with a charging rate or temperature of a battery. In this case, although not specifically limited, the controller may decrease a maximum regenerative electric power as the charging rate of the battery increases or the temperature of the battery increases. With this configuration, it is possible to reduce the degradation of the battery by reducing a load on the battery.

In an embodiment of the technology, the controller may determine a change width by which a maximum braking torque is changed, in accordance with a change width by which the maximum regenerative electric power has been changed. With this configuration, when the maximum regenerative electric power has been changed, it is possible to effectively reduce an uncomfortable feeling of a user. The controller just needs to be able to change the maximum regenerative electric power at least in two levels (for example, during normal times and during times of limitation) and, accordingly, just needs to be able to change the maximum braking torque at least in two levels (similarly, during normal times and during times of limitation).

In the above embodiment, the controller may, when the controller has changed the maximum regenerative electric power, identify a variation width of a stimulus received by a user before and after the change and determine the change width by which the maximum braking torque is changed, in accordance with the identified variation width of the stimulus. The stimulus received by the user from acceleration or deceleration of the vehicle varies in accordance with a combination of the speed and acceleration or deceleration of the vehicle. Therefore, when the maximum regenerative electric power has been changed, the speed of the vehicle is taken into consideration in addition to the variation width of the braking torque before and after the change. Thus, it is possible to identify the variation width of the stimulus received by the user in the medium and high speed range. Then, by determining the change width of the maximum braking torque in accordance with the identified variation width of the stimulus, the variation width of the stimulus received by the user in a low speed range can be matched with or approximated to the variation width of the stimulus received by the user in a medium and high speed range. Thus, the impression received by the user during the regenerative braking of the vehicle can be matched or approximated before and after the maximum regenerative electric power is changed.

In the above-described embodiment, a variation width of a stimulus received by the user in accordance with the change width of the maximum regenerative electric power may be equal to a variation width of a stimulus received by the user in accordance with the change width of the maximum braking torque. Here, the word "equal" is not limited to a perfectly equal state and allows a deviation within the range in which the user is not able to perceive the deviation, for example, a deviation within 15 percent.

In an embodiment of the technology, the controller may be able to change the maximum braking torque regardless of whether the maximum regenerative electric power has been changed. In other words, the controller may change the maximum braking torque only in accordance with various situations and requests.

In the above embodiment, the controller may, when the controller has changed the maximum braking torque, identify a variation width of a stimulus received by the user before and after the change and set a limit on a braking torque in each vehicle speed range in accordance with the identified variation width of the stimulus. With this configuration, the impression received by the user can be matched or approximated during the regenerative braking of the vehicle before and after the maximum braking torque is changed.

In the above-described embodiment, the controller may change the maximum braking torque in accordance with a property of a road surface on which the vehicle runs. With this configuration, when, for example, the vehicle runs on a road surface with a low friction coefficient, such as a snow cover surface, it is possible to provide stable running of the vehicle by setting a lower maximum braking torque. When the lower maximum braking torque is set, a limit is also set on a braking torque in each vehicle speed range. Thus, an uncomfortable feeling of a user is reduced.

An electrified vehicle 10 according to an embodiment will be described with reference to the accompanying drawings. The electrified vehicle 10 is a so-called automobile and is a vehicle that runs on a road surface. As shown FIG. 1, the electrified vehicle 10 includes a body 12, a plurality of wheels 14*f*, 14*r*, and a plurality of side doors 16, 18. The body 12 is not limited and is mainly made of a metal. A cabin 12*c* is provided inside the body 12. The cabin 12*c* is configured to be capable of accommodating one or more users. A pedal device 26 that is operated by the user is provided in the cabin 12*c*.

Figure 1:
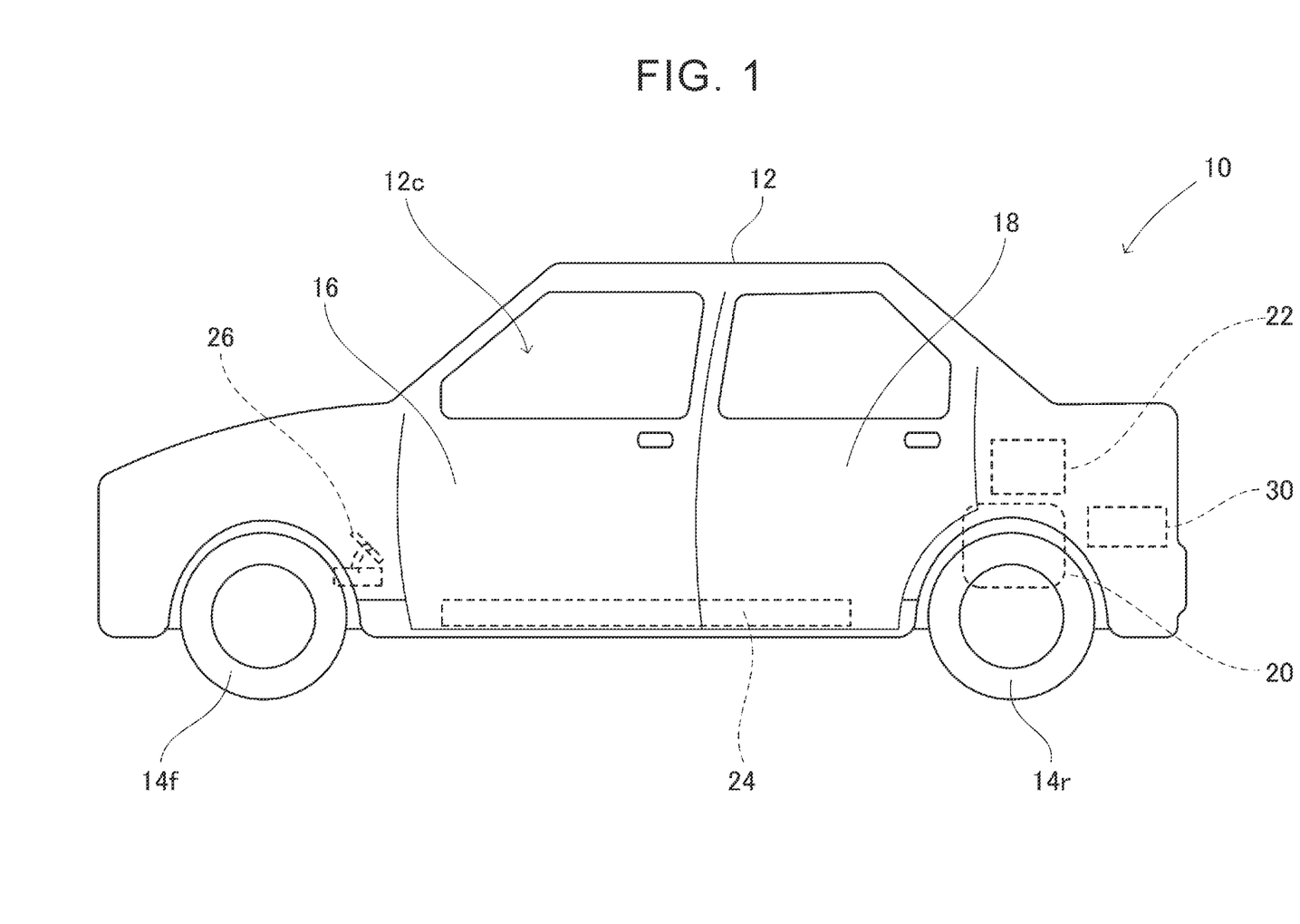
FIG. 1 is a view schematically showing an electrified vehicle according to an embodiment.

Each of the wheels 14*f*, 14*r* is rotatably supported by the body 12. The wheels 14*f*, 14*r* include a pair of the front wheels 14*f* located at the front of the body 12 and a pair of the rear wheels 14*r* located at the rear of the body 12. The front wheels 14*f* are disposed coaxially with each other at the front of the body 12. The rear wheels 14*r* are disposed coaxially with each other at the rear of the body 12. The front wheels 14f each are a steered wheel that changes the orientation of the rotation axis. The rear wheels 14r each are a drive wheel that is driven by a motor 20. The number of the wheels 14f, 14r is not limited to four.

Figure 2:
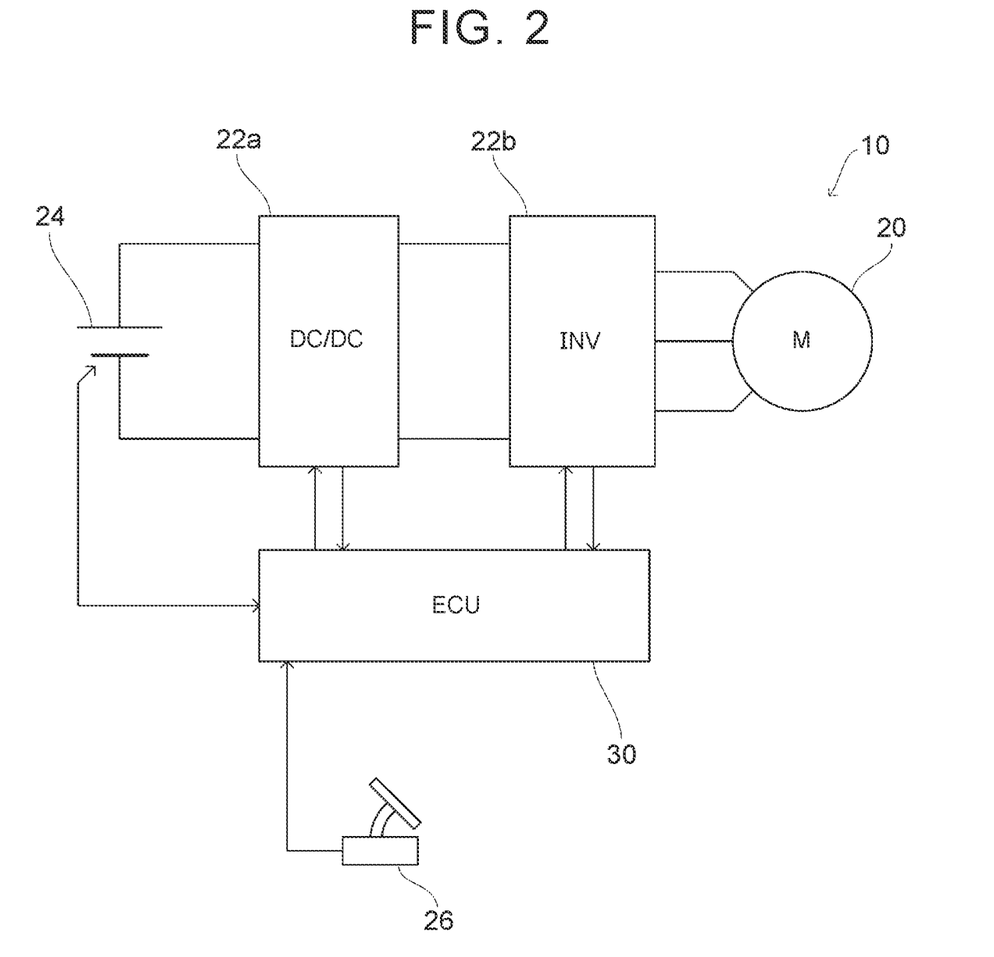
FIG. 2 is a block diagram showing the electrical configuration of the electrified vehicle according to the embodiment.

As shown in FIG. 1 and FIG. 2, the electrified vehicle 10 further includes the motor 20, a power conversion unit 22, a battery pack 24, and an electronic control unit 30. The motor 20 is a drive motor that drives the rear wheels 14r. The motor 20 is mechanically connected to the rear wheels 14r. The battery pack 24 is a power supply that supplies electric power to the motor 20. The battery pack 24 is electrically connected to the motor 20 via the power conversion unit 22. The battery pack 24 incorporates a plurality of secondary battery cells. The battery pack 24 is configured to be rechargeable with electric power supplied from an external source or regenerative electric power generated by the motor 20. For example, the power conversion unit 22 includes a DC-DC converter 22a and an inverter 22b.

The electronic control unit 30 is communicably connected to the power conversion unit 22, the battery pack 24, and the pedal device 26 and monitors and/or controls the operations of the power conversion unit 22, the battery pack 24, and the pedal device 26. For example, the electronic control unit 30 controls the operation of the power conversion unit 22 in accordance with the operation of the pedal device 26 by the user. Thus, when, for example, the user depresses the pedal device 26 by foot, driving power is supplied from the battery pack 24 to the motor 20, and the rear wheels 14r are driven by the motor 20. On the other hand, when the user releases the foot from the pedal device 26, regenerative electric power is supplied from the motor 20 to the battery pack 24, and the rear wheels 14r are subjected to regenerative braking by the motor 20.

The motor 20 is not limited to being configured to drive the pair of rear wheels 14r. The motor 20 may be configured to drive at least one of the wheels 14f, 14r. The electrified vehicle 10 may further include another driving source, such as an engine, in addition to the motor 20. The electrified vehicle 10 may include another power supply, such as a fuel cell unit and a solar cell panel, in addition to the battery pack 24. In other words, the electrified vehicle 10 is not limited to a rechargeable battery electric vehicle and may be a hybrid electric vehicle, a fuel cell electric vehicle, a solar car, or the like. The electrified vehicle 10 according to the present embodiment is not limited to a vehicle that is driven by a user, and also includes a vehicle that is operated by an external device and an electrified vehicle that autonomously runs.

The electronic control unit 30 according to the present embodiment is an example of the controller that controls regenerative braking of the motor 20. The electronic control unit 30 stores a maximum braking torque and a maximum regenerative electric power as indices used to control the regenerative braking. The maximum braking torque is a limiting value (upper limit value) of the braking torque in regenerative braking and is an index for preventing an excessive braking torque. The maximum regenerative electric power is a limiting value (upper limit value) of the regenerative electric power in regenerative braking and is an index for preventing an excessive regenerative electric power supplied to the battery pack 24. The electronic control unit 30 controls the regenerative braking of the motor 20 such that the braking torque is less than or equal to the maximum braking torque and the regenerative electric power is lower than or equal to the maximum regenerative electric power.

Figure 3:
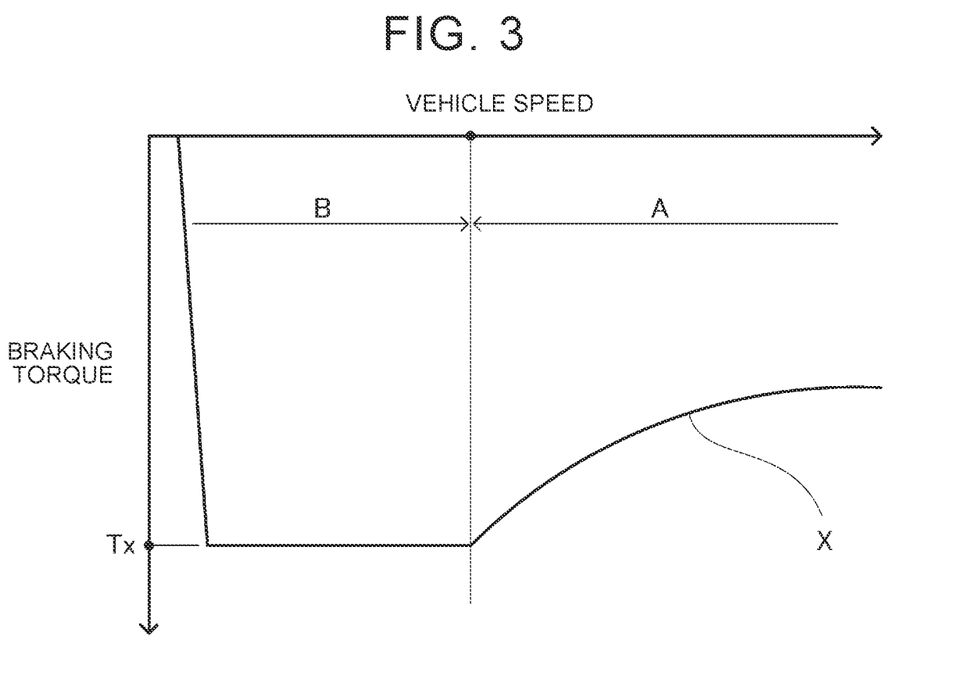
FIG. 3 shows a relationship between the speed and braking torque of the electrified vehicle in regenerative braking during normal times.

As shown in FIG. 3, when the speed of the electrified vehicle 10 is in a medium and high speed range A, the regenerative electric power reaches the maximum regenerative electric power before the braking torque reaches the maximum braking torque (Tx). Thus, the regenerative braking of the motor 20 is limited. On the other hand, when the speed of the electrified vehicle decreases and falls in a low speed range B, the braking torque reaches the maximum braking torque (Tx) before the regenerative electric power reaches the maximum regenerative electric power. Thus, the regenerative braking of the motor 20 is limited. As a result, there can be a difference in actually generated braking torque between the medium and high speed range A and the low speed range B, and the difference is comparatively small.

Here, a set value of the maximum regenerative electric power may be changed in accordance with, for example the charging rate or temperature of the battery pack 24. Thus, for example, it is possible to reduce the degradation of the battery pack 24. The electronic control unit 30 according to the present embodiment may be configured to change the maximum regenerative electric power in accordance with the charging rate of the battery pack 24. More specifically, when the charging rate of the battery pack 24 exceeds a predetermined threshold, the electronic control unit 30 is configured to limit the regenerative electric power supplied to the battery pack 24 by decreasing the maximum regenerative electric power. In other words, during normal times, a first value is used as the maximum regenerative electric power; whereas, during activation of a limit, a second value lower than the first value is used as the maximum regenerative electric power.

Figure 4:
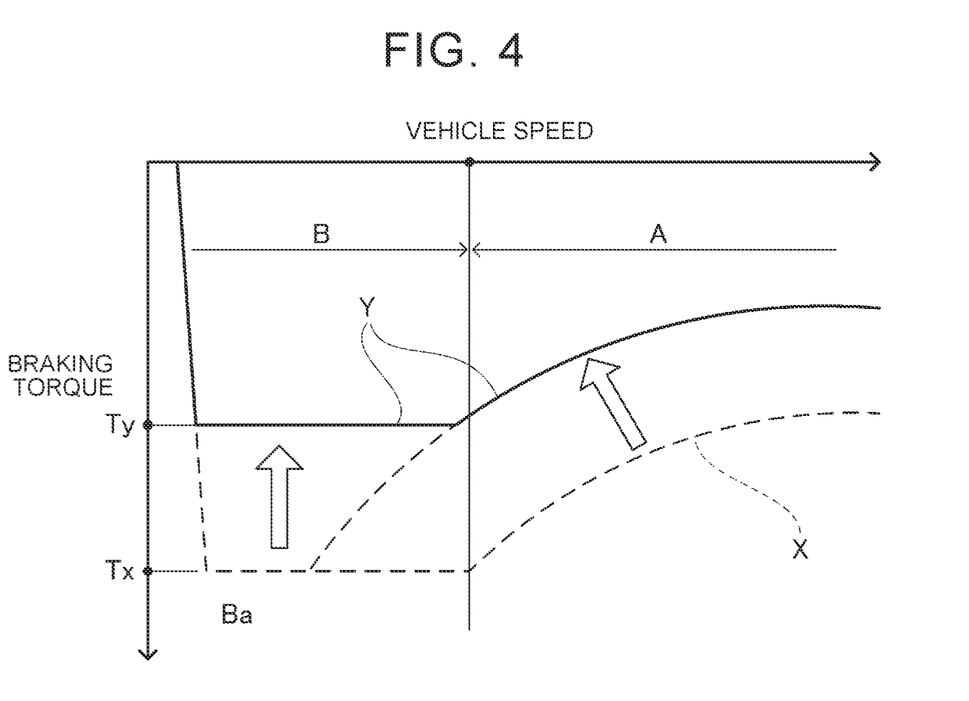
FIG. 4 shows a relationship between the speed and braking torque of the electrified vehicle in regenerative braking during times of limitation.

As shown in FIG. 4, when the maximum regenerative electric power is decreased as compared to normal times, regenerative braking is further limited in the medium and high speed range A, so an actually generated braking torque also further decreases. In contrast, in part of the low speed range B, even when the maximum regenerative electric power is set so as to be lower than that during normal times, the regenerative braking is not limited by the maximum regenerative electric power. As a result, if only the maximum regenerative electric power is changed and the maximum braking torque (Tx) is maintained, it leads to further large variations in actually generated braking torque between the medium and high speed range A and the low speed range B. Such a behavior of the electrified vehicle 10, different from normal times, may make a user in the electrified vehicle 10 feel uncomfortable.

For the above inconvenience, the electronic control unit 30 according to the present embodiment is configured to, when the electronic control unit 30 has changed the maximum regenerative electric power, change the maximum braking torque (from Tx to Ty in FIG. 4). Thus, when the maximum regenerative electric power has been changed, a braking torque actually generated in the low speed range B is also able to be varied in synchronization with a variation in braking torque actually generated in the medium and high speed range A. It is possible to match or approximate variations in braking torque actually generated from the medium and high speed range A to the low speed range B before and after the maximum regenerative electric power is changed. Therefore, it is possible to reduce an uncomfortable feeling of a user and appropriately limit the regenerative braking of the electrified vehicle 10.

Figure 5:
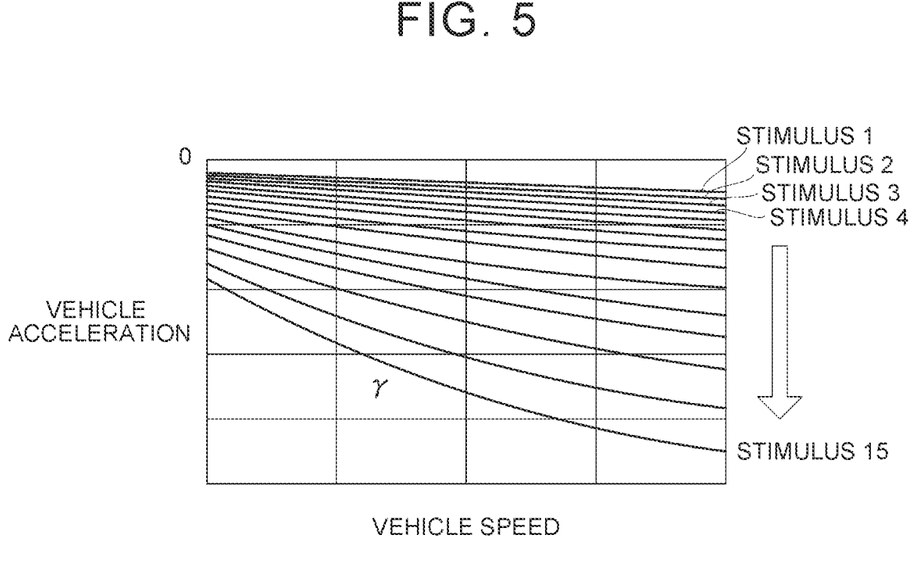
FIG. 5 is a map showing a stimulus received by a user for a combination of the speed and acceleration of the electrified vehicle.

Although not limited, the electronic control unit 30 may be configured to determine a change width by which the maximum braking torque is changed, in accordance with a change width by which the maximum regenerative electric power has been changed. In this case, a stimulus γ received by the user as a result of acceleration or deceleration of the electrified vehicle 10 can be taken into consideration. As shown in FIG. 5, the stimulus γ received by the user from acceleration or deceleration of the electrified vehicle 10 varies in accordance with a combination of the speed and acceleration or deceleration of the electrified vehicle 10. Therefore, while regenerative braking of the electrified vehicle 10 is performed and the speed of the electrified vehicle 10 varies from the medium and high speed range A to the low speed range B, the stimulus γ received by the user also varies from moment to moment. When a variation width Δγ of the stimulus γ received by the user during the regenerative braking is different between before and after the maximum regenerative electric power is changed, that is, when the variation width Δγ is different between normal times and times of limitation, the user may experience an uncomfortable feeling. Therefore, when the maximum braking torque is changed in accordance with a change in the maximum regenerative electric power, a deviation in braking torque, which occurs between the medium and high speed range A and the low speed range B, is not simply matched before and after the change, and a variation width Δγ of the stimulus γ received by the user can be matched or approximated.

An example of a control mode for changing the maximum regenerative electric power and the maximum braking torque in consideration of the stimulus γ as described above will be described with reference to FIG. 6. Initially, in step S12, the electronic control unit 30 acquires the charging rate of the battery pack 24. Subsequently, in step S14, the electronic control unit 30 determines whether the maximum regenerative electric power needs to be changed, based on the charging rate of the battery pack 24. When the electronic control unit 30 determines that the maximum regenerative electric power does not need to be changed (NO in step S14), the process returns to step S12. On the other hand, when the electronic control unit 30 determines that the maximum regenerative electric power needs to be changed (YES in step S14), the process proceeds to step S16.

Figure 6:
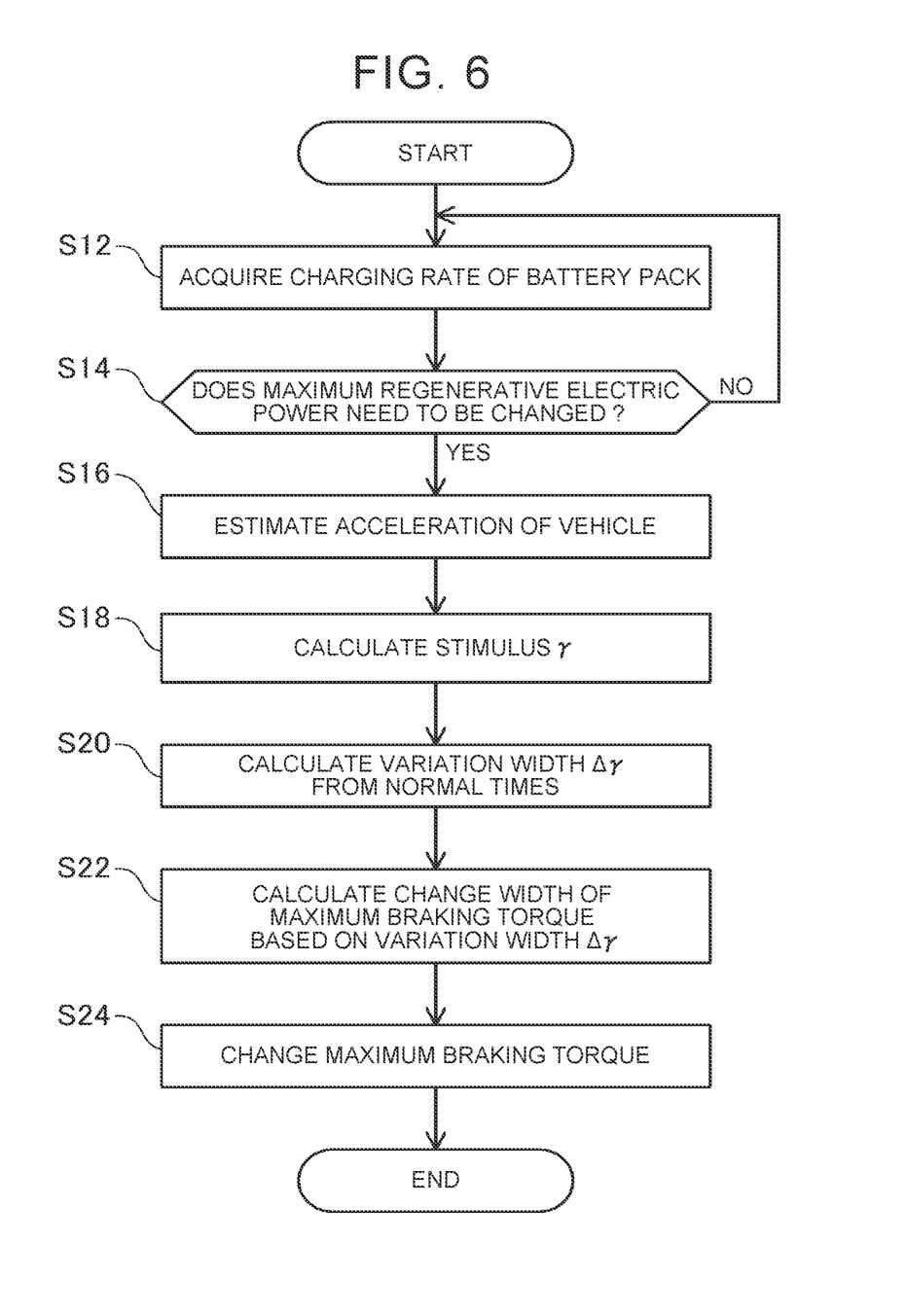
FIG. 6 is a flowchart showing an example of a control mode that is executed by an electronic control unit.

In step S16, the electronic control unit 30 estimates a longitudinal acceleration of the electrified vehicle 10 based on the changed maximum regenerative electric power. Here, the electrified vehicle 10 performs regenerative braking, so the estimated acceleration is a negative value. After that, in step S18, the electronic control unit 30 calculates the stimulus γ received by the user by using the estimated acceleration and the speed of the electrified vehicle 10. To estimate the stimulus γ, the electronic control unit 30 can prestore, for example, a map of the stimulus γ as shown in FIG. 5. Subsequently, in step S20, the electronic control unit 30 calculates a variation width Δγ of the stimulus γ from normal times, that is, a variation width Δγ of the stimulus γ between before and after the maximum regenerative electric power is changed.

After that, in step S22, the electronic control unit 30 calculates a change width of the maximum braking torque based on the calculated variation width Δγ of the stimulus γ. More specifically, the electronic control unit 30 calculates the change width of the maximum braking torque such that the variation width Δγ of the stimulus γ before and after the maximum braking torque is changed is equal to the variation width Δγ of the stimulus γ, calculated in step S20. Finally, in step S24, the electronic control unit 30 changes the maximum braking torque by using the calculated change width of the maximum braking torque.

As described above, the electronic control unit 30 can, when the electronic control unit 30 has changed the maximum regenerative electric power, identify a variation width Δγ of the stimulus γ received by the user before and after the change and determine a change width for changing the maximum braking torque in accordance with the identified variation width Δγ of the stimulus γ. Thus, it is possible to match or approximate the variation width Δγ of the stimulus γ received by the user before and after the maximum regenerative electric power is changed. Hence, it is possible to effectively reduce an uncomfortable feeling of the user and appropriately limit the regenerative braking of the electrified vehicle 10.

Although not limited, the electronic control unit 30 according to the present embodiment may be able to change the maximum braking torque regardless of whether the maximum regenerative electric power has been changed. For example, the electronic control unit 30 may change the maximum braking torque in accordance with the property (particularly, friction coefficient) of a road surface on which the electrified vehicle 10 runs. With this configuration, when, for example, the electrified vehicle 10 runs on a road surface with a low friction coefficient, such as a snow cover surface, it is possible to provide stable running of the electrified vehicle 10 by setting a lower maximum braking torque.

The electronic control unit 30 is able to take the stimulus γ received by the user into consideration when the maximum braking torque is changed as well, as in the case of when the maximum regenerative electric power is changed. In this case, the electronic control unit 30 may, when the electronic control unit 30 has changed the maximum braking torque, identify a variation width Δγ of the stimulus γ received by the user before and after the change and set a limit on a limiting torque in each vehicle speed range in accordance with the identified variation width Δγ of the stimulus γ. Thus, it is possible to match or approximate the variation width Δγ of the stimulus γ received by the user before and after the maximum braking torque is changed. In other words, it is possible to reduce an uncomfortable feeling of the user.

An example of a control mode for changing the maximum braking torque in consideration of the stimulus γ as described above will be described with reference to FIG. 7. Initially, in step S32, the electronic control unit 30 estimates the friction coefficient of a road surface on which the electrified vehicle 10 runs. This estimation may be performed based on, for example, the relationship between a torque output by the motor 20 and an acceleration generated in the electrified vehicle 10. Subsequently, in step S34, the electronic control unit 30 determines whether a road surface on which the electrified vehicle 10 runs corresponds to a predetermined road surface with a low friction coefficient, based on the estimated friction coefficient. When the electronic control unit 30 determines that the road surface does not correspond to the road surface with a low friction coefficient (NO in step S34), the process returns to step S32. On the other hand, when the electronic control unit 30 determines that the road surface corresponds to the road surface with a low friction coefficient (YES in step S34), the process proceeds to step S36.

Figure 7:
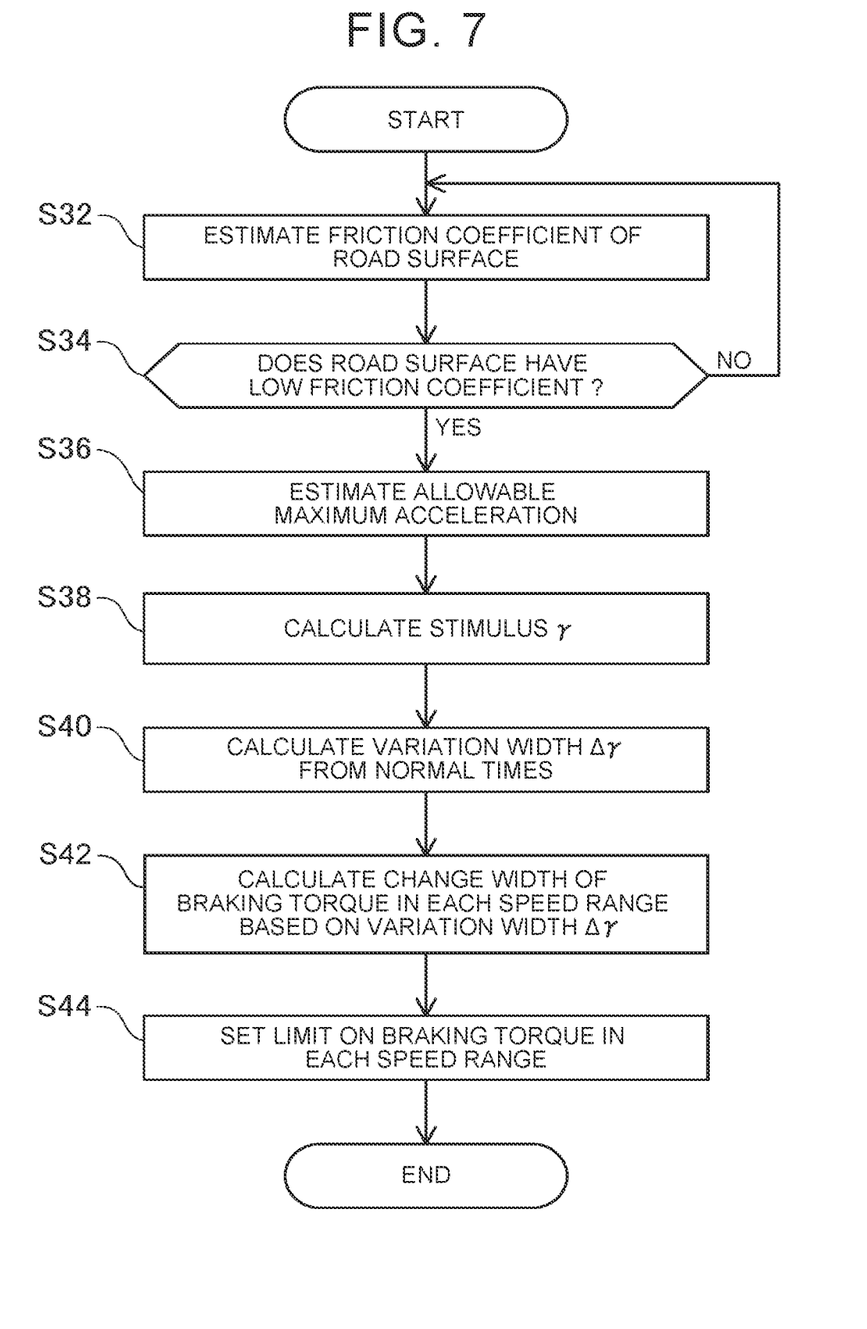
FIG. 7 is a flowchart showing an example of another control mode that is executed by the electronic control unit.

After that, in step S36, the electronic control unit 30 estimates a maximum longitudinal acceleration allowed for the electrified vehicle 10 based on the estimated friction coefficient of the road surface. Here, the electrified vehicle 10 performs regenerative braking, so the estimated maximum acceleration is a negative value. After that, in step S38, the electronic control unit 30 calculates a stimulus γ received by the user by using the estimated maximum acceleration and the speed of the electrified vehicle 10. Subsequently, in step S40, the electronic control unit 30 calculates a variation width $\Delta\gamma$ of the stimulus $\gamma$ from normal times, that is, a variation width $\Delta\gamma$ of the stimulus $\gamma$ before and after the maximum acceleration is changed.

Subsequently, in step S42, the electronic control unit 30 calculates a change width of the braking torque in each speed range (particularly, medium and high speed range A) based on the calculated variation width $\Delta\gamma$ of the stimulus $\gamma$. More specifically, the electronic control unit 30 calculates a change width of the braking torque in each speed range such that the variation width $\Delta\gamma$ of the stimulus $\gamma$ when the braking torque is changed is equal to the variation width $\Delta\gamma$ of the stimulus $\gamma$, calculated in step S40, in each speed range. Finally, in step S44, the electronic control unit 30 sets a limit on the braking torque of each speed range by using the calculated change width of the braking torque.

As described above, the electronic control unit 30 is able to, when, for example, the electrified vehicle 10 runs on a road surface with a low friction coefficient, such as a snow cover surface, change the maximum braking torque for regenerative braking and set a limit on the braking torque in each speed range in consideration of the stimulus $\gamma$ received by the user. Thus, it is possible to match or approximate the impression received by the user during regenerative braking of the electrified vehicle 10 before and after the maximum braking torque is changed. In other words, it is possible to reduce an uncomfortable feeling of the user and provide an appropriate limit on the braking torque for regenerative braking.

The embodiments of the technology have been described in detail above; however, these are only illustrative and are not intended to limit the appended claims. The technology described in the appended claims also encompasses various modifications and changes from the specific examples illustrated above. The technical elements described in the specification or the drawings exhibit technical usability solely or in various combinations and are not limited to combinations of the appended claims at the time of filing the application. The technology illustrated in the specification and drawings can achieve multiple purposes at the same time and has technical usability by achieving one of those purposes.

What is claimed is:

1. An electrified vehicle comprising:
    a motor connected to wheels and configured to perform regenerative braking at the wheels;
    a battery configured to store regenerative electric power output by the motor through the regenerative braking; and
    an electronic control unit configured to:
    control the regenerative braking such that a braking torque applied to the wheels is less than or equal to a maximum braking torque and the regenerative electric power output by the motor is lower than or equal to a maximum regenerative electric power,
    change the maximum regenerative electric power by a change amount based on a charging rate of the battery or a temperature of the battery,
    estimate a vehicle acceleration based on the change in the maximum regenerative electric power,
    calculate a stimulus received by a user based on the vehicle acceleration before and after the change of the maximum regenerative electric power,
    identify a variation amount of the stimulus received by the user before and after the change of the maximum regenerative electric power, and
    when the electronic control unit has changed the maximum regenerative electric power, change the maximum braking torque by a change amount determined in accordance with the identified variation amount of the stimulus received by the user before and after the change of the maximum regenerative electric power.

2. The electrified vehicle according to claim 1, wherein the variation amount of the stimulus received by the user in accordance with the change amount of the maximum regenerative electric power is equal to a variation amount of a stimulus received by the user in accordance with the change amount of the maximum braking torque.

3. The electrified vehicle according to claim 1, wherein the electronic control unit is configured to be able to change the maximum braking torque regardless of whether the maximum regenerative electric power has been changed.

4. The electrified vehicle according to claim 3, wherein the electronic control unit is configured to, when the electronic control unit has changed the maximum braking torque, identify a variation amount of a stimulus received by the user before and after the change of the maximum braking torque and set a limit on a braking torque in each vehicle speed range in accordance with the identified variation amount of the stimulus received by the user before and after the change of the maximum braking torque.

5. The electrified vehicle according to claim 3, wherein the electronic control unit is configured to change the maximum braking torque in accordance with a property of a road surface on which the electrified vehicle runs.

* * * * *